US006088512A

United States Patent [19]

Ancin et al.

[11] Patent Number: 6,088,512

[45] Date of Patent: Jul. 11, 2000

[54] VOID-AND-CLUSTER DITHER-MATRIX GENERATION FOR BETTER HALF-TONE UNIFORMITY

[75] Inventors: Hakan Ancin, Cupertino; Anoop Bhattacharjya, Sunnyvale; Joseph Shu, San Jose, all of Calif.

[73] Assignee: Seiko Epson Corporation, Tokyo, Japan

[21] Appl. No.: 08/890,611

[22] Filed: Jul. 9, 1997

Related U.S. Application Data

[60] Provisional application No. 60/028,615, Aug. 15, 1996, and provisional application No. 60/034,846, Jan. 27, 1997.

[51] Int. Cl.[7] .............................. B41B 15/00; B41J 15/00; H04N 1/40

[52] U.S. Cl. .......................... 395/109; 358/456; 358/457; 382/270

[58] Field of Search .................................... 395/101, 109; 358/455, 456, 457, 534, 535, 536, 448; 382/205, 237, 270

[56] References Cited

U.S. PATENT DOCUMENTS

| | | | |
|---|---|---|---|
| 5,201,030 | 4/1993 | Carrie | 395/132 |
| 5,535,020 | 7/1996 | Ulichney | 358/457 |
| 5,557,709 | 9/1996 | Shu | 395/109 |

OTHER PUBLICATIONS

Gotsman, Craig and Alleback, Jan P., "Bounds and Algorithms for Dither Screens," Conference on "Human Vision & Electronic Imaging," as part of EI–96, San Jose, CA Jan. 27–Feb. 2, 1996, SPIE vol. No. 2657.

Ulichney, Robert, "The Void–and–Cluster Method for Dither Array Generation," IS&T/SPIE Symposium on Electronic Imaging Science & Tech., San Jose, CA, Feb. 3, 1993.

*Primary Examiner*—Thomas D. Lee
*Attorney, Agent, or Firm*—Mark P. Watson

[57] ABSTRACT

Dither thresholds are assigned one after the other to matrix locations in the process of generating a dither matrix used for printer half-toning. The matrix location to be assigned the next threshold is chosen by locating the tightest cluster or largest void in the dot pattern that will result from the gray level with which the threshold being assigned is associated. Measures of cluster tightness for low-range and high-range thresholds are based on the areas of Voronoi partitions associated with respective candidate locations. For mid-range thresholds, a Gaussian-filter output is used as the measure. In both cases, ties between candidate locations are resolved by applying a further criterion, which depends on the candidate locations' proximities to locations assigned thresholds the same as the one being assigned or differing from it by only one. If a tie still remains, the matrix is divided into blocks, a determination is made of the number of dots that will result from various blocks' thresholds at the gray level associated with the threshold being assigned, and a choice is made among the remaining candidate locations in accordance with the numbers of dots determined for the respective blocks in which they are located.

21 Claims, 12 Drawing Sheets

| | | | | | | | | |
|---|---|---|---|---|---|---|---|---|
| 0.0008 | 0.0039 | 0.0117 | 0.0229 | 0.0286 | 0.0229 | 0.0117 | 0.0039 | 0.0008 |
| 0.0039 | 0.0183 | 0.0556 | 0.1084 | 0.1353 | 0.1084 | 0.0556 | 0.0183 | 0.0039 |
| 0.0117 | 0.0556 | 0.1690 | 0.3292 | 0.4111 | 0.3292 | 0.1690 | 0.0556 | 0.0117 |
| 0.0229 | 0.1084 | 0.3292 | 0.6412 | 0.8007 | 0.6412 | 0.3292 | 0.1084 | 0.0229 |
| 0.0286 | 0.1353 | 0.4111 | 0.8007 | 1.0000 | 0.8007 | 0.4111 | 0.1353 | 0.0286 |
| 0.0229 | 0.1084 | 0.3292 | 0.6412 | 0.8007 | 0.6412 | 0.3292 | 0.1084 | 0.0229 |
| 0.0117 | 0.0556 | 0.1690 | 0.3292 | 0.4111 | 0.3292 | 0.1690 | 0.0556 | 0.0117 |
| 0.0039 | 0.0183 | 0.0556 | 0.1084 | 0.1353 | 0.1084 | 0.0556 | 0.0183 | 0.0039 |
| 0.0008 | 0.0039 | 0.0117 | 0.0229 | 0.0286 | 0.0229 | 0.0117 | 0.0039 | 0.0008 |

FIG. 11

VOID-AND-CLUSTER DITHER-MATRIX GENERATION FOR BETTER HALF-TONE UNIFORMITY

RELATED APPLICATIONS

This Application claims the benefit under 35 U.S.C. §119 (e) of U.S. Provisional Patent Applications Ser. Nos. 60/028, 615, filed Aug. 15, 1996, for Image Enhancement and Screen Generation Techniques, and 60/034,846, filed Jan. 27, 1997, for Void-and-Cluster for Better Halftone Uniformity, which are hereby incorporated by reference.

BACKGROUND OF THE INVENTION

The present invention is directed to image processing and particular to developing dither matrices for dispersed dither.

Image data are typically taken and stored in formats that are not well suited to use by image-presentation devices such as printers. A digitally stored or processed gray-scale image typically consists of a finely quantized—say, 8-bit—scalar pixel value associated with each a large number of picture elements ("pixels") of which the image consists. Digital color images are similar, except the pixel value is a vector rather than a scalar, and a similarly finely quantized value represents each of the vector's color components. So although the following discussion will be presented in terms of gray-scale images, it applies equally to a color image's individual color components.

Consider the case of an 8-bit-per-pixel digital image. A pixel can have any gray value between 0, for completely white, and 255 ($=2^8-1$), for completely black. Actually, the meaning in the stored image is often just the reverse—i.e., 0 represents completely black and 255 represents completely white. But when the imaging device is one like a printer, in which an increase in the applied amount of the imaging agent (ink in the case of a printer) results in a reduction in image brightness, the image data are usually converted to complementary values during the image-presentation process. The discussion that follows will be presented in terms of such complementary color values—i.e., a higher value will mean a darker image—but the principles apply equally to a positive-color presentation such as that which occurs in a cathode-ray tube.

In contrast to the original image's 256 possible values, the typical printer can render any single pixel only completely white or completely black (in gray-scale printing). Some printers are capable of somewhat finer value quantization, but the quantizations of which even those are capable are almost always coarser than that of the original image. To achieve the illusion of finer gray-scale quantization, printers use half-toning, in which the gray level is achieved in a uniform-gray-level region by alternating black pixels with white pixels, the percentage of each depending on the gray-scale effect to be achieved. Of course, most images of interest have regions whose pixel values are not uniform, so there has to be a way to half-tone pixels whose intensity values change from one pixel to the next. A relatively fast way to perform half-toning on such images is known as "dithering."

Dithering involves comparing pixel values with respective threshold values of a dither matrix. To make the description more concrete, let us assume that the dither-matrix size is 128×128. Dashed lines in FIG. 1 divide a paper sheet's image-receiving region 10 into corresponding-size subregions. That is, subregion 11 is 128 pixel widths wide and 128 pixel heights high. A dithering process involves conceptually laying the dither matrix over each such subregion so that each pixel is associated with a respective dither threshold. Comparing a given pixel's image value with its thus-assigned threshold value determines whether the pixel will receive an ink dot. If the image value at a given pixel exceeds that pixel's dither threshold, then the pixel receives an ink dot. Otherwise it does not. So the dither-operation output for each pixel is a binary indication of whether that pixel will receive an ink dot.

The design of the dither-matrix threshold pattern depends on a number of factors. If the intended image-presentation system is of the type that does not effectively present isolated pixels, for instance, the dither-matrix pattern will typically be of the "clustered-dot," or "amplitude-modulation" variety, in which low threshold values tend to be clustered together so that printed pixels will tend not to be isolated. The resultant clusters of printed pixels are larger or smaller in accordance with the image's intended darkness. But a different type of dither-matrix pattern, known as the "dispersed-dot," or "frequency-modulation" type, is more frequently used when the image-presentation system can effectively print isolated pixels, because the results achievable with dispersed-dot matrices are generally considered superior.

Although dispersed-dot matrices' results can be superior, whether they actually are depends on the particular dither matrix's threshold-value pattern. Uniform gray areas in the resultant presented image tend to have annoying low-frequency patterns if high and low threshold values are not dispersed homogeneously throughout the dither matrix. But a fairly large dither matrix is required if such homogeneity is to be achieved without a loss of gray-scale resolution, and assigning threshold values with the required homogeneity to large dither matrices is not trivial. So considerable effort has been devoted to developing automatic ways of assigning threshold values.

U.S. Pat. No. 5,557,709 to Shu et al. for a Method and Apparatus for Dither Array Generation to Reduce Artifacts in Halftoned Images describes an advantageous approach. Whereas the purpose of the dither matrix is to yield homogeneously dispersed dots for any gray level, the method described in that patent begins with a particular, although somewhat arbitrarily chosen, initial gray level and chooses a homogeneous initial dot pattern in which the percentage of dots corresponds to the initial gray level. Individual dots are then removed one by one to achieve progressively lighter gray-scale values. (Of course, this is all done mathematically. The "dot pattern" is a binary-valued matrix having as many locations as the dither matrix to be generated, "adding a dot" at a particular pixel means setting the corresponding binary-matrix location's contents to a logical "1," and "removing a dot" means setting the location's contents to a logical "0.")

Now, if the dither matrix is to yield the selected initial dot pattern in response to the chosen initial gray level, all of its thresholds corresponding to the dot-containing locations in the initial pattern must have thresholds lower than that initial gray level. And when enough dots have been removed to result in the next-lighter gray level that pixel values of the intended resolution can represent, we know that threshold values corresponding to the remaining dots must be lower than one less than the initial gray level. Therefore, the threshold values corresponding to the locations from which dots were removed in achieving the next-lighter gray level must be equal to that gray level, and this is the threshold assigned to those dither-matrix locations. By continuing the process, lower thresholds can be assigned until all dither-matrix locations corresponding to dots in the initial pattern have been assigned thresholds. Higher threshold values are then assigned by again starting with that same initial dot pattern but adding dots rather than removing them.

The image quality that result from applying the resultant dither matrix depends on the initial dot pattern and on the manner in which dots are chosen for removal and addition. One advantageous way of choosing the initial dot pattern is described in the above-mentioned Shu et al. patent, which we hereby incorporate by reference. Briefly, it involves employing a further homogenization process to the dot pattern that results from applying the initial gray level to a different half-toning process, known as "error diffusion," which itself is known to result in relatively homogeneous dot patterns but is comparatively after dot removal or addition, dots are selected for removal by identifying the dot that is most crowded by other dots. This is also referred to as removing dots from the tightest "clusters." Dots are selected for addition—i.e., pixels without dots are selected to receive them—by identifying the pixels at the centers of the largest "voids." (Actually, the terms cluster and void are defined in most discussions not, as we have here, by reference to dots and their absence but rather by reference to the presence or absence of "minority" pixels. So when the number of dot-containing pixels overtakes the number of pixels without dots in those discussions, the process of placing dots in the lightest areas is no longer called placing them in the largest voids and instead starts being called adding them to the tightest "clusters"—in this case, clusters of pixels that do not contain dots.)

SUMMARY OF THE INVENTION

Although the images that result from using dither matrices generated in this fashion are generally high in quality, we have found that improved image quality can result if we apply a further criterion when a tie occurs, i.e., when several locations' clusters are the tightest, or several locations' voids are the largest. In those situations, we apply another criterion, which depends only on locations that have been assigned ranks that are in some sense near to the rank being assigned.

For instance, if two or more pixels are tied for selection because they are located in equally tight clusters, we attempt to break the tie by again assessing the respective tightnesses of those two pixels' clusters. But whereas any neighboring minority pixel contributes to a cluster when the criterion is applied the first time, the only pixels that can contribute to clusters the second time are those that are close in what will be referred to below as "rank." Those considered close in rank may be, for instance, those that have been assigned thresholds that equal or differ only by one from the threshold currently being assigned. If a tie still remains, we divide the subregion into blocks and choose among the candidate pixels in accordance with the number of dots contained by the blocks in which they are located. By selecting the next-to-be-assigned dither-matrix location in this fashion, we have been able to improve the resultant image quality significantly.

BRIEF DESCRIPTION OF THE DRAWINGS

The invention description below refers to the accompanying drawings, of which:

FIG. 11 is a diagram of a Gaussian kernel used to assess void size.

DETAILED DESCRIPTION OF AN ILLUSTRATIVE EMBODIMENT

Figure 1:
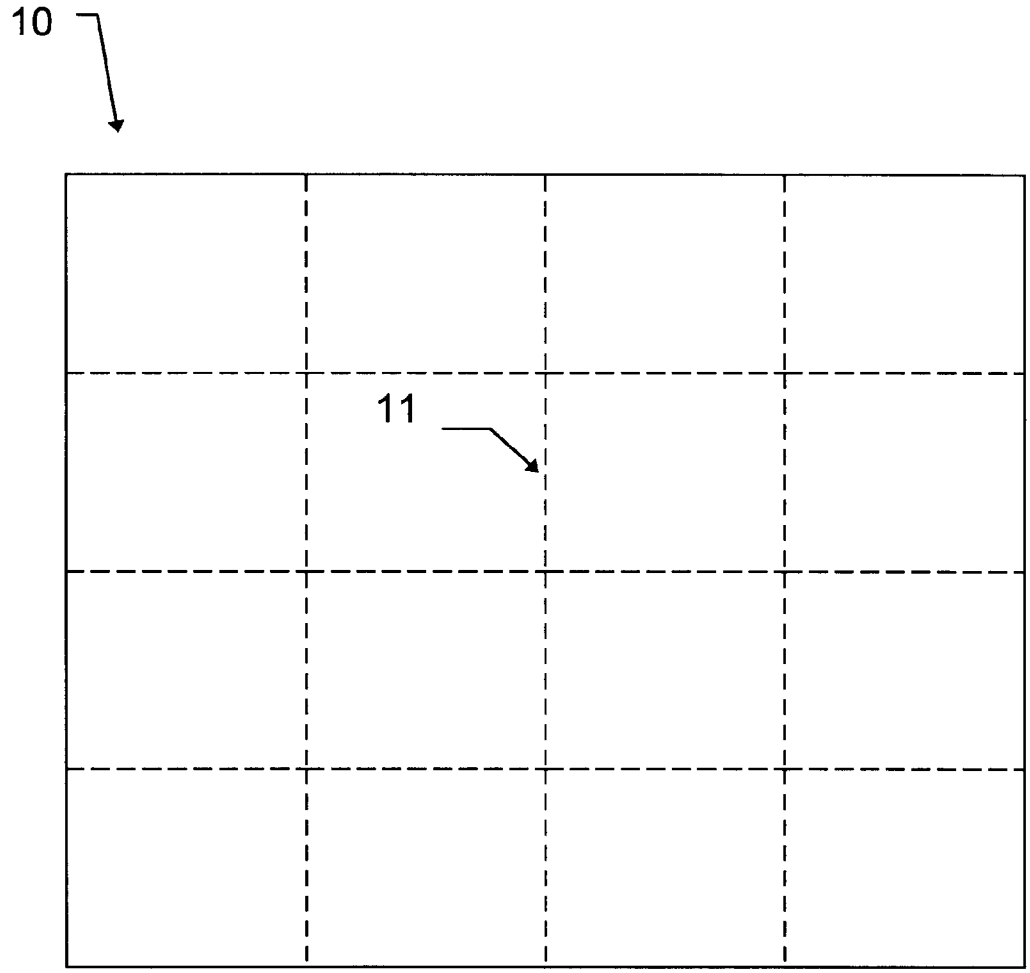
FIG. 1, described above, is a diagram of an image space divided into subregions "tiled" with a dither matrix for half-toning purposes.
Figure 2:
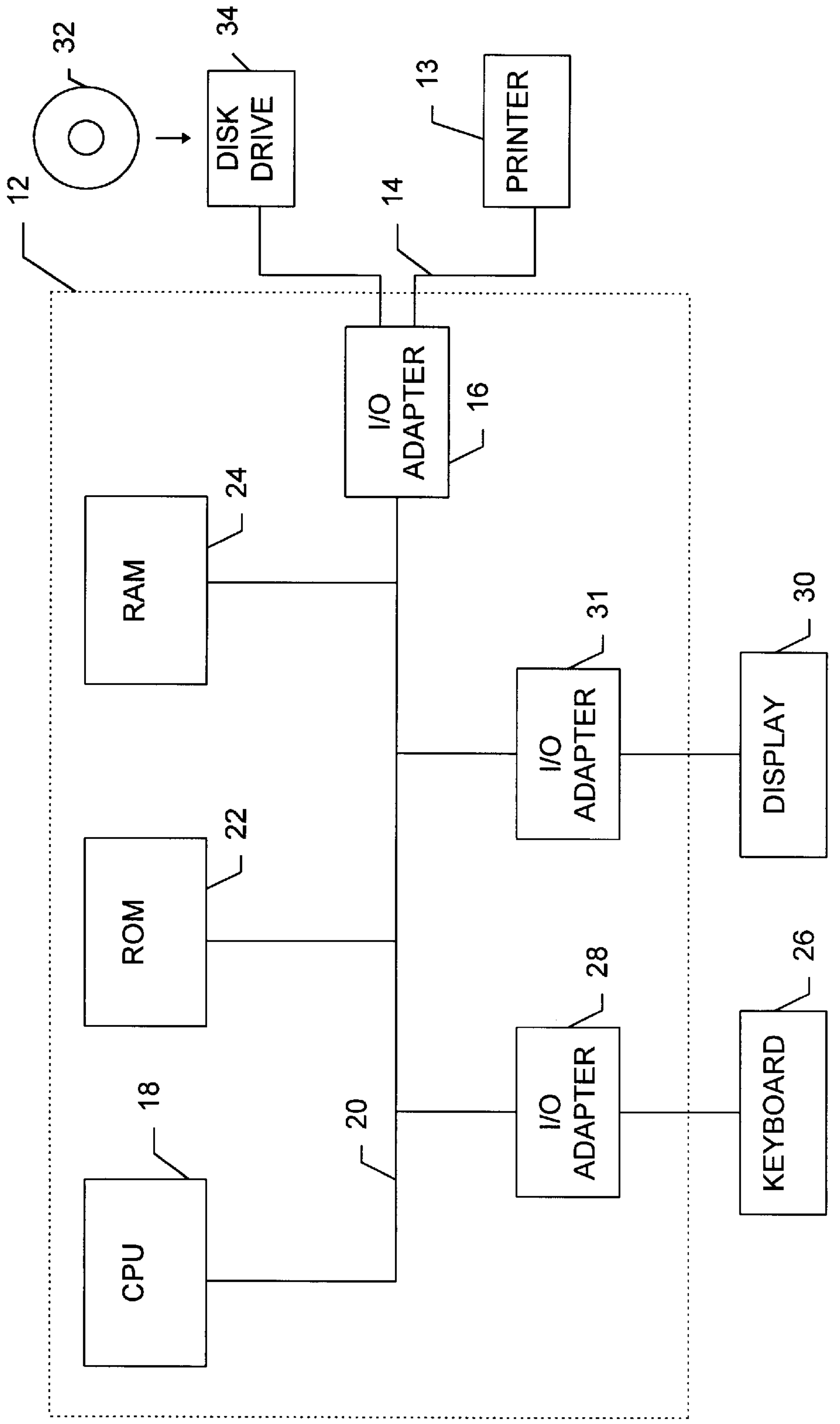
FIG. 2 is a block diagram of an image-presentation system that employs a dither matrix generated in accordance with the present invention's teachings.
Figure 3:
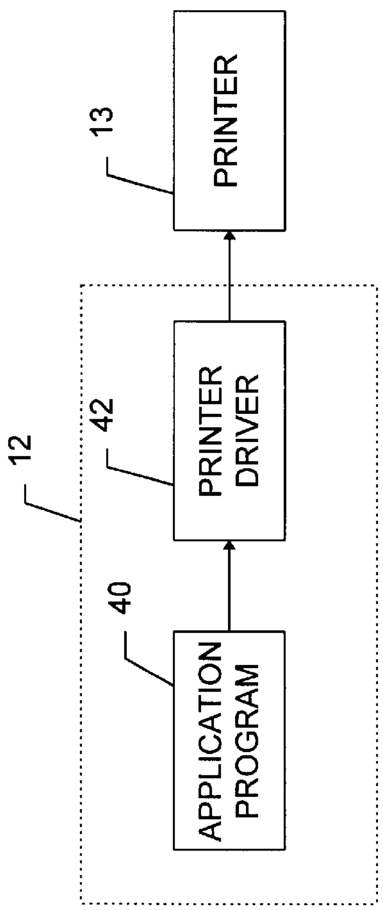
FIG. 3 is a block diagram that illustrates the presentation system from more of a software standpoint.
Figure 4:
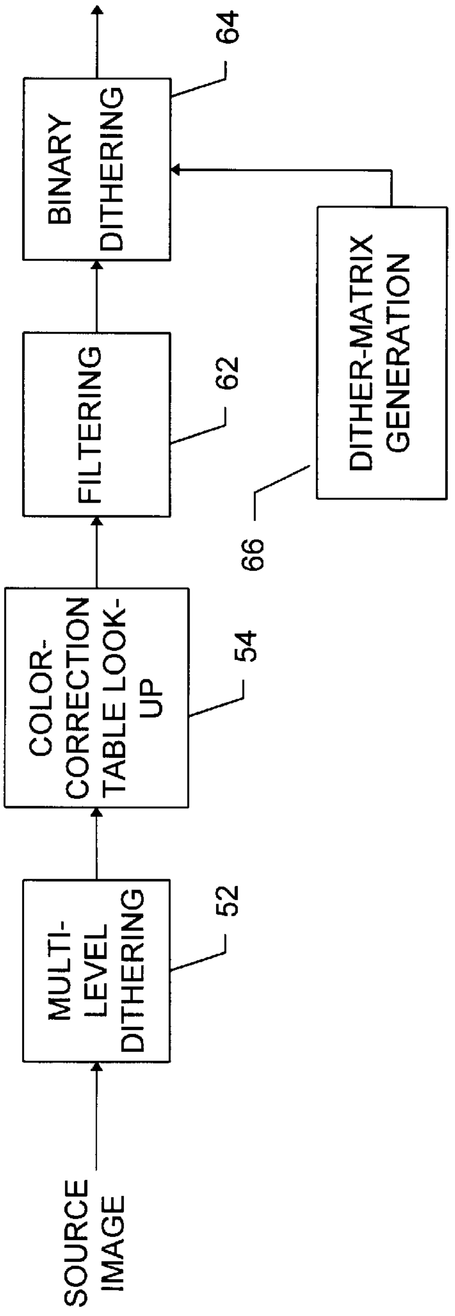
FIG. 4 is a flow chart of a typical image-processing sequence in which a dither matrix generated in accordance with the present invention's teachings can be used.

Before we describe the present invention's dither-matrix-design approach, we will describe an exemplary environment by reference to FIGS. 2, 3, and 4. As the invention description proceeds, it will become apparent that the invention can be employed to generate dither matrices that are embodied in dedicated circuitry designed particularly for image presentation. For instance, such an arrangement can be included within a printer that receives instructions that describe an image in terms of finely quantized nominal colors or gray-scale values, and it can include dedicated circuitry that dithers the image in the process of converting the requested values to the on-and-off or other coarse-quantization instructions required to render the requested image. But matrices generated in accordance with the invention will more typically be used in a general-purpose machine, such as a personal computer operating as a printer driver, whose purpose is to convert an image expressed in nominal color values into presentation-device commands that specify the low-level, typically on-or-off operation of a printer that the computer controls.

FIG. 2 depicts a typical hardware environment. A personal computer 12 sends a presentation device such as an ink-jet printer 13 low-level instructions, i.e., instructions that specify which individual presentation-medium pixels should receive dots. Computers that are capable of employing dither matrices produced in accordance with the present invention come in a wide variety of configurations, and FIG. 2 depicts one in which the printer 13 receives these instructions by way of an appropriate channel 14 provided by an input-output adapter 16 with which a central processing unit 18 communicates through an internal bus 20.

Of course, the central processing unit 18 will typically fetch data and instructions at various times from a variety of sources, such as solid-state read-only and read-write memories 22 and 24. FIG. 2 also depicts the computer 12 as communicating, as is typical, with a keyboard 26 by way of an interface adapter 28. The central processing unit 18 is also shown coupled to a cathode-ray-tube display 30 by a display adapter 31.

The present invention particularly concerns generating dither matrices for use with presentation devices within this environment, and in this connection the computer 12 can employ such matrices not only to drive printer 13 but also to form an image on the cathode-ray-tube display 30; the broader aspects of the invention are applicable to any pixel-organized presentation device. But we will restrict our attention to its use for operating the printer.

In the typical situation, the computer 12 employs the present invention's dither matrices in the course of acting as a printer driver. The instructions that configure the computer to perform this function are usually included in the operating-system software stored on a disc 32 that the central processing unit 18 can read with the aid of the computer's disc drive 34. Often, the disc 32 will have been loaded from another disc drive that reads another type of disc, such as a diskette, a CD-ROM, or a DVD. In any event, the computer 12 reads the driver instructions from the disc drive 32 in most cases and then performs the below-described functions to implement the present invention's teachings.

FIG. 3 depicts the typical operational environment from the software standpoint. The dither matrix generated in accordance with the present invention's teachings typically comes into play when the computer 12 is operating a user's application program 40 and that program makes a system call requesting that an image be printed. The requested operation is carried out by a printer driver 42, which is usually considered to be part of the operating system but is specific to the designated printer. The printer driver's purpose is to convert a device-independent representation of the image into low-level printer instructions that will cause the printer to render that image as faithfully as the printer's limitations permit.

There are many types of image-processing sequences that can profitably employ dither matrices generated in accordance with the present invention's teachings. The sequence that FIG. 4 depicts is typical. A dither matrix generated in accordance with the present invention's teachings can be used in a multi-level dithering operation 52. For the purpose of explaining that operation, we briefly depart from our gray-scale-only description to assume that the source-image representation consists of twenty-four bits per pixel, i.e., eight bits per color component, and is subjected to color-correction operations that blocks 52 and 54 represent. The multi-level dithering operation 52 quantizes the source values: each color component in step 52's quantized output can assume one of only seventeen possible values, which are used in step 54 to address a color-correction look-up table used to correct certain imperfections in the printing process. Alternatively, one can omit the dithering step 52 by instead employing the coarse-quantization addresses closest to the fine-quantization input values and generating outputs from the thus-addressed contents by tetrahedral interpolation. By so limiting the number of possible look-up-table addresses, the table size can be limited to 17×17×17 instead of the impractical 256×256×256 size that would otherwise have been required. Commonly assigned U.S. patent application Ser. No. 08/607,074, filed Feb. 26, 1996, by Shu et al. for Generating Color-Correction Look-Up-Table Addresses by Multi-Level Half-Toning, describes these operations further. We incorporate that application by reference.

In a typical arrangement, each look-up-table location may contain, for example, four four-bit values, one each for the cyan, magenta, yellow, and black inks that the printer will use. The values may be chosen to correct for the non-ideal colors of the inks that various printers employ and for the non-linear effects of ink-dot shapes. They may also be used to limit ink use enough to prevent the ink from bleeding on paper of the intended type and convert the image from a positive-color representation (such as red, green, and blue) typically used for computer monitors to the complementary-color representation (such as cyan, magenta, and yellow) used more commonly for color printers.

We now return to discussing the invention and its environment in terms of gray-scale processing, but it is apparent that the discussion applies equally to each color component. Each such component may be subjected to image smoothing and/or edge enhancement in a filtering operation 62 before a dithering operation 64 whose binary output for each pixel indicates whether that pixel will receive an ink drop.

The present invention concerns an operation 66, which generates the dither matrix that dithering operation 64 employs. Operation 66 differs from the operations that the other FIG. 4 blocks represent in that it typically is not performed in real time during image processing or, indeed, by the computer 12 that does the image processing. There is no reason why computer 12 cannot perform such an operation, but dither-matrix-generating circuitry will more typically be embodied in a separate computer, which may additionally embody the circuitry that produces the driver software that the disc 32 contains, i.e., that produces the computer-readable instructions that configure computer 12 to perform image processing in accordance with the dither matrix and to cause an image-presentation mechanism to present the results. That separate computer would typically operate a disc drive or other recording device to record the driver software on a computer disc or other computer-readable medium. Of course, the dither-matrix-generating and driver-generating circuitry do not have to be embodied in a computer in order to carry out the present invention's teachings, but other implementations can be expected to be less common.

Subsequent drawings illustrate the dither-matrix-generation operation 66. To make the description more concrete, we will assume that the matrix is intended for a dither operation having eight-bit input values and one-bit output values, so there are 256 possible input pixel values for each pixel. The number of different threshold values must therefore be one less, i.e., 255. Since the assumed matrix size is 128×128, each threshold value will be present at either 64 or 65 dither-matrix locations (191 values×64 locations/value+65 values×64 locations/value=128×128 locations).

Figure 5A:
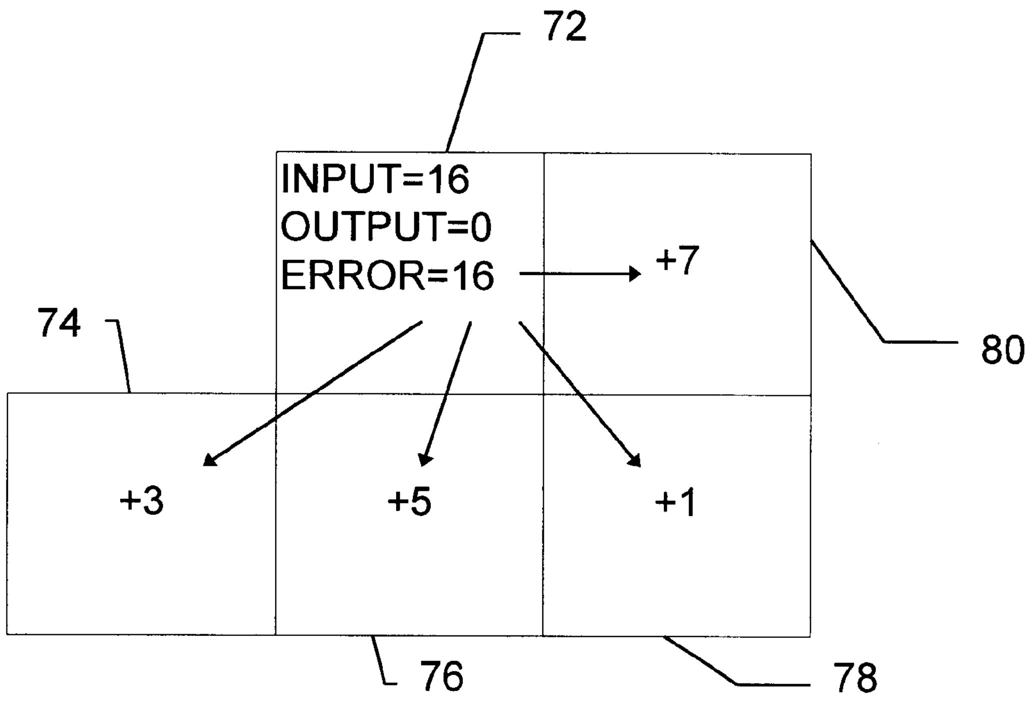
FIG. 5A is a diagram that illustrates error diffusion.
Figure 5B:
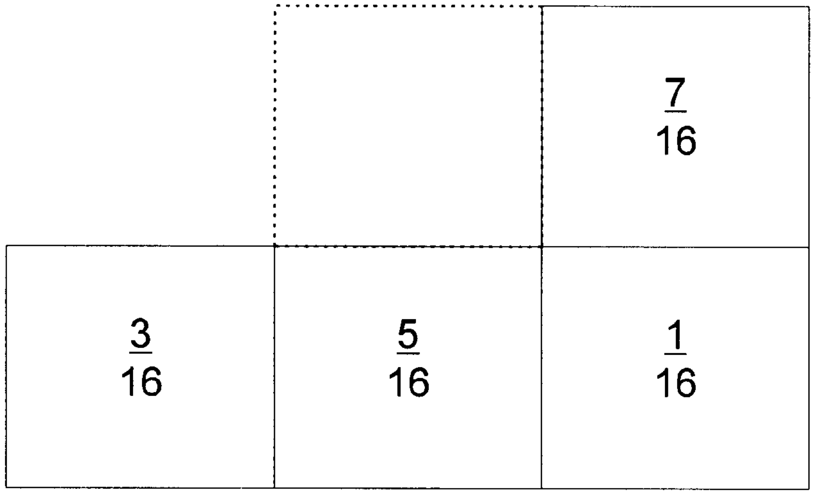
FIG. 5B is a diagram of the kernel used in the error-diffusion example of FIG. 5B.

Now, the general approach for assigning dither-matrix values starts with some-what arbitrarily choosing an initial light-gray value and selecting the (sparse) initial dot pattern that should be used in a subregion that is to present that initial gray level uniformly. Various approaches to obtaining that initial dot pattern can be used. The dot pattern can be obtained, for instance, from a dither-matrix-sized subregion of the output produced by applying "error diffusion" to an image consisting uniformly of the initial gray level. Error diffusion is a well-known half-toning method in which the quantization error that results from half-toning at one pixel is "diffused" to neighboring pixels. For instance, if the half-toning threshold for FIG. 5A's pixel 72 is 128 but the image's value at that pixel (as adjusted for error in a manner to be described presently) is only 16, then no ink will be deposited at that pixel; i.e., its darkness will be 0 instead of 16, so an error of 16 results. In the error-diffusion method, this error is divided among its neighbors in accordance with an error-diffusion kernel such as the one that FIG. 5B illustrates. For example, out of the 16-point error, pixel 74's input value may be incremented by 16×3/16=3 before threshold comparison, and the input values of pixels 76, 78, and 80 will be similarly incremented by 5, 1, and 7, respectively. For reasons similar to those to be described presently in connection with FIG. 8, if pixel 72 is located at the image's right edge, the error shown as diffused to pixel 78 is "wrapped" to the pixel at the left end of the corresponding row. Error diffusion tends to minimize overall error better than dithering, but dithering is preferred in many situations because it is less computation intensive.

Figure 6:
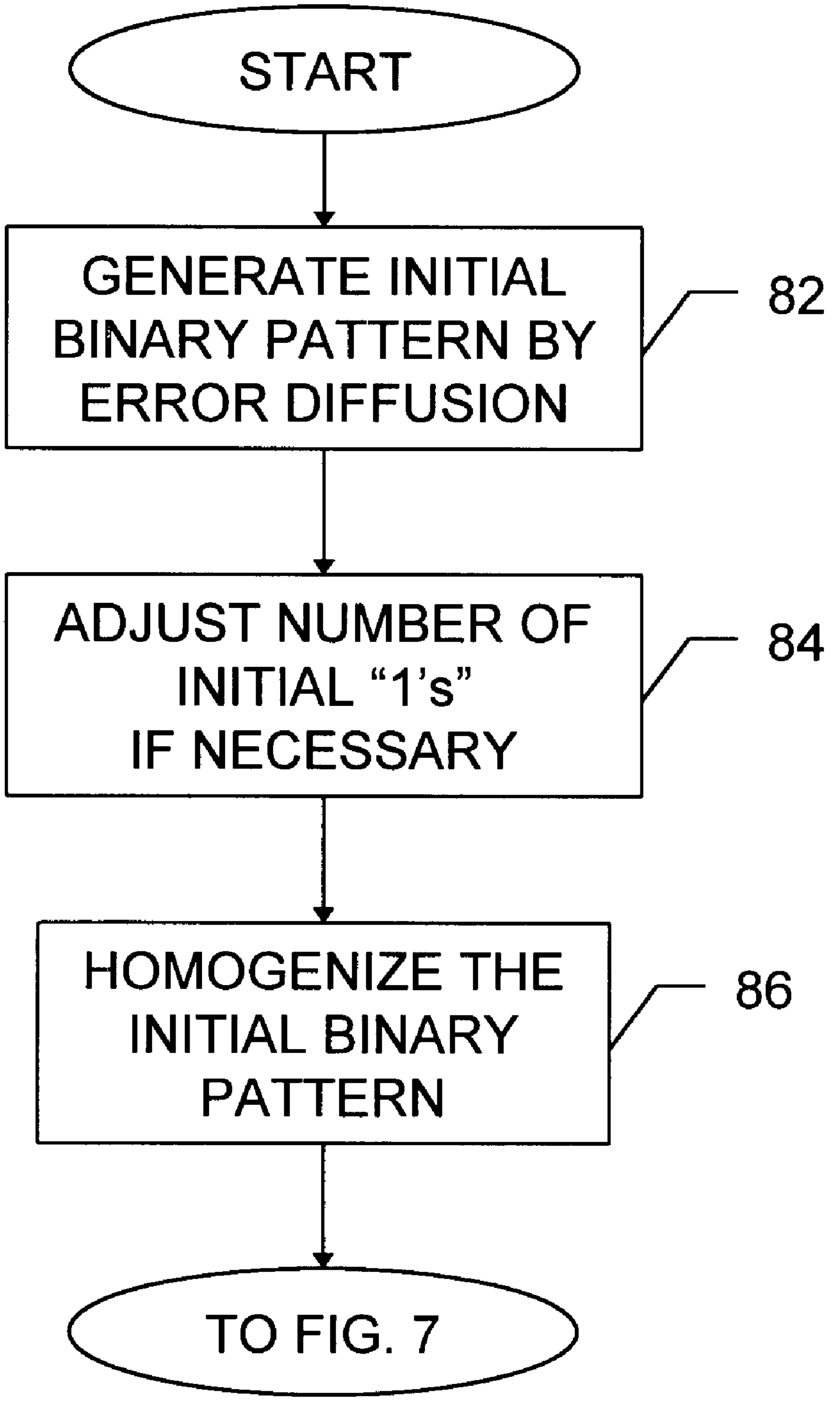
FIG. 6 is a flow chart of the initialization stage of the present invention's method of generating a dither matrix.

FIG. 6's block 82 represents the error-diffusion process. The purpose of the sequence that FIG. 6 represents is to generate a binary-value matrix whose size is that of the dither matrix to be generated and whose elements indicate whether the corresponding subregion pixels will receive an ink dot when that subregion presents a uniform gray value equal to the starting value: binary-value-matrix locations containing "1's" correspond to the subregion pixels that should receive ink dots when all input pixel values equal the starting value, and binary-value-matrix locations containing "0's" correspond to the other subregion pixels. Suppose the initial gray-scale value is, say, 10 (light gray) on a scale of 0 (white) to 255 (black). That means that ink should ideally be deposited at 642 subregion pixels, i.e., at 10/255 of the 128×128 subregion pixels, so there should ideally be that many logical "1's" in the error-diffusion output.

In practice, the number of "1's" may not be quite 642, so points may have to be added, as block 84 indicates. The matrix locations chosen for dot addition are selected from among candidates corresponding to pixels that contain "Voronoi vertices." As will be explained below in connection with FIG. 8, a Voronoi vertex is a point that is equidistant from the centers of at least the three dot-containing pixels to which it is closest, and the largest void, or white space, will therefore contain such a point. Just which of these points is disposed in the largest void is determined by assigning each candidate location a score that results from centering a convolution kernel on the candidate and taking the sum of the kernel coefficients that thereby correspond to pixels that do not yet contain dots. An 11×11 Gaussian kernel having a standard deviation of 1.5 pixel widths is an appropriate kernel for this purpose, although other kernel types can be used instead. We describe various other metrics for void size and cluster tightness in connection with subsequent phases of the method.

Even if the number of dots needs no adjustment, the error-diffusion process may leave inhomogeneities in those dots' placement, and a homogenization process 86 is performed by moving "1's" from the tightest clusters to the largest voids until removal of a "1" from the tightest cluster creates the largest void.

Having now identified the subregion pixels that should receive ink dots to produce the initial gray-scale level, we turn to the task of assigning the dither-matrix thresholds that will result in ink dots so located. We assign the thresholds in phases. We know that the thresholds in the dither-matrix locations corresponding to the "1"-containing initial binary-value matrix should all be less than 10, and the thresholds should be 10 or more at all other locations. The first phase of the threshold-assigning task is to determine the locations of all thresholds less than 10.

Figure 7:
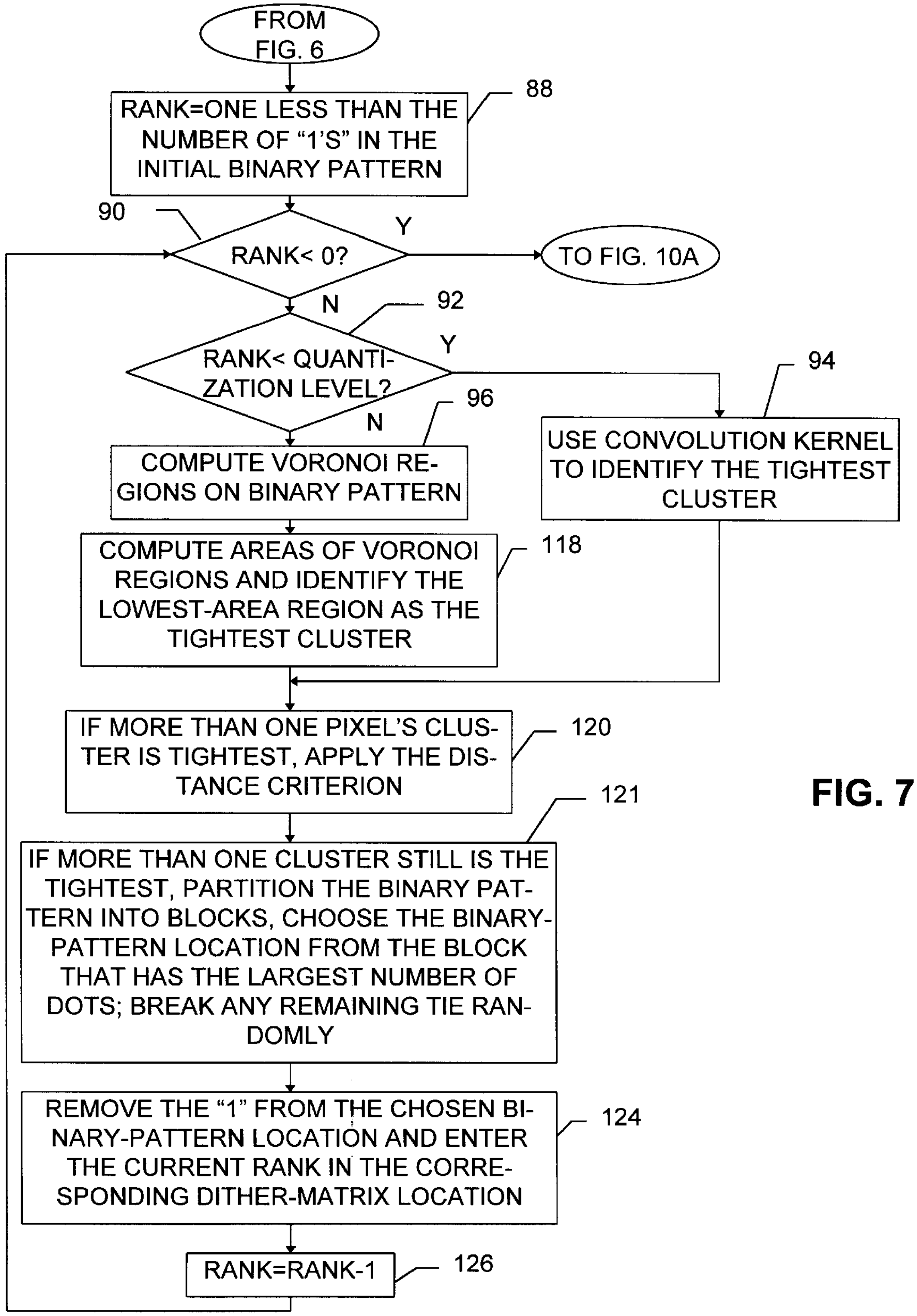
FIG. 7 is a flow chart of the present invention's method of assigning the lowest rank values to the dither-matrix locations.

FIG. 7 depicts this phase, which involves repetitively removing a "1" from the binary matrix's most-crowded location, i.e., conceptually removing an ink dot from the remaining ink-dot location that is most crowded after previous ink-dot removals. When enough "1's" have been removed to reduce the number remaining to the number of ink dots needed to present an gray value of 9, all dither-matrix locations corresponding to binary-value-matrix locations from which "1's" have been removed in the process should receive a threshold value of 9: ink-dot deposition should be permitted at those locations when the gray level is 10 but not when it is 9. By continuing to remove "1's" in this fashion, locations that should receive the threshold values from 8 through 0 can be similarly identified.

FIG. 7 depicts this phase of the operation without referring to actual threshold values, which depend on the number of quantization levels and dither-matrix size (in the example, $2^8$=256 and 128×128, respectively). FIG. 7 instead describes it in more-general terms as assigning each location a rank, which indicates the corresponding subregion pixel's order in the sequence in which those pixels would receive ink dots if the subregion were being darkened as incrementally as the number of subregion pixels allows. That is, the rank and threshold are the same if the number of input quantization levels ($2^8$ in this example) is one greater than the number of dither-matrix locations (128×128 in this example), which therefore equals the number of thresholds. Otherwise, the threshold is readily obtained from the rank by using a relationship such as:

$$T=\mathrm{trunc}(RN_T/N_L),$$

where T is the threshold value, trunc(x) is the highest integer not greater than x, R is the rank, $N_T$ is the number of thresholds ($2^8-1=255$ in the example), and $N_L$ the number of dither-matrix locations. We prefer to assign by computing rank values initially, since explicitly assigning and storing rank values permits the same assignment operation to be used for different degrees of quantization. That is, once ranks R have been determined, different dither matrices can be generated for different values of $N_T/N_L$ without any further processing other than applying the above equation for T. As the foregoing equation indicates, though, assigning a dither-matrix location a rank is equivalent to assigning it a threshold for the purposes of the present invention, and we will refer to the two concepts interchangeably.

The rank of the dither-matrix location corresponding to the first binary-matrix location from which a "1" is discarded in the example would be 641, since it would be the last of the first 642 locations to receive an ink dot if the subregion were being darkened incrementally. FIG. 7's block 88 represents thus initializing the rank value. The procedure that FIG. 7 represents is repeated for increasingly low rank values until all of the ranks for the initially chosen locations have been assigned as determined in a step that block 90 represents.

We use two different ways of identifying the location corresponding to the most-crowded subregion pixel. When the population of "1's" in the binary-value matrix—that is, the number of ink dots remaining in the subregion that the dither matrix conceptually covers—reaches the number of locations that should receive a threshold value of 0, as determined in a step that block 92 indicates, we assess the degree of crowding by centering a convolution kernel on the candidate and taking the sum of the kernel coefficients that thereby correspond to pixels in which dots remain. As before, we use an 11×11 kernel whose values are proportional to a two-dimensional Gaussian function having a standard deviation of 1.5. Block 94 represents selecting among locations on the basis of crowding as thereby assessed.

Before the number of remaining dots falls to the 0-threshold level, however, the most-crowded pixels are identified by Voronoi partitioning, which block 96 represents. Voronoi partitioning can be understood by reference to FIG. 8.

Figure 8:
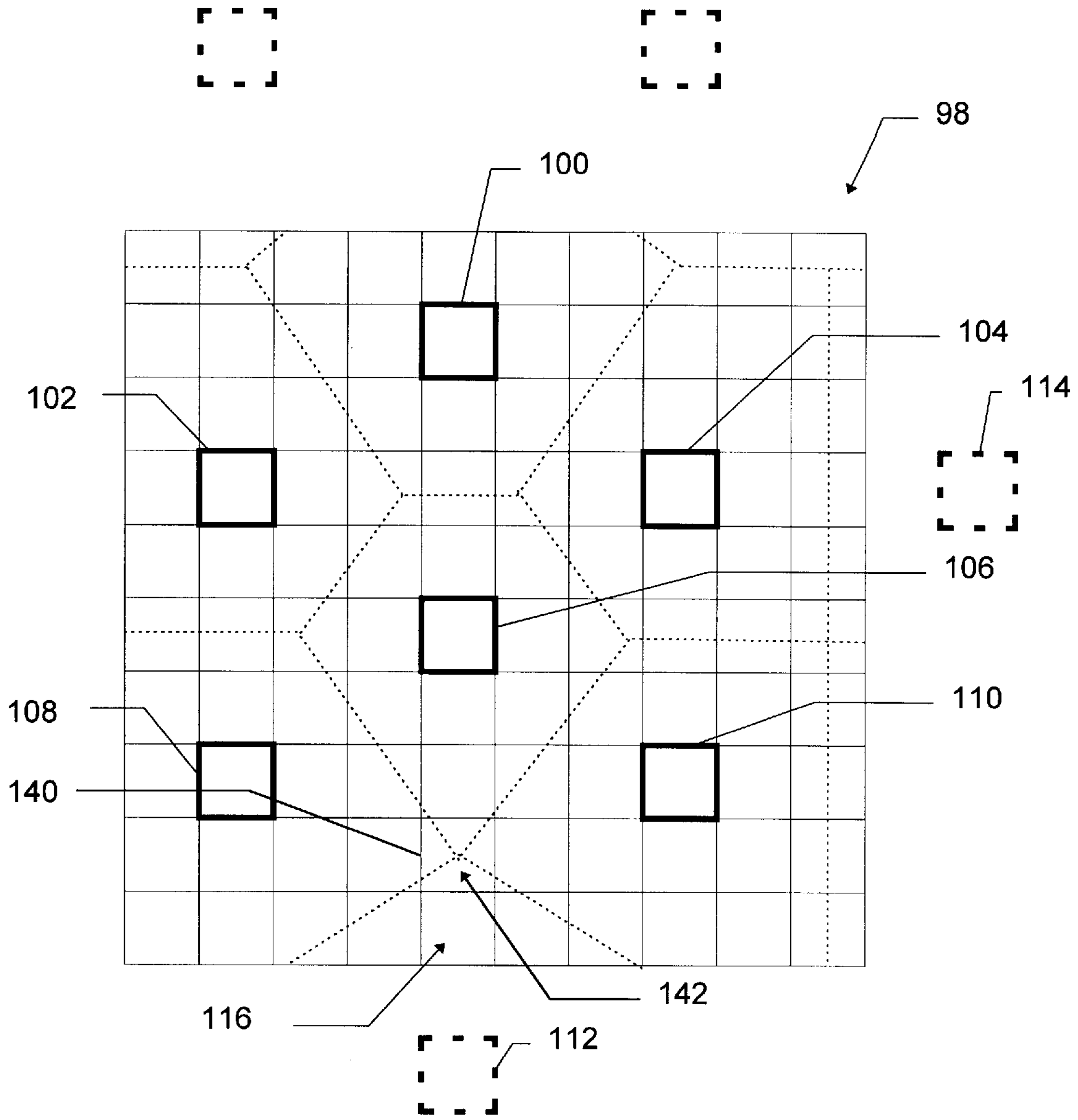
FIG. 8 is a diagram used to illustrate Voronoi partitioning.

FIG. 8 depicts a subregion 98 defined by a dither matrix whose size is 10×10 for the sake of illustration; i.e., it is much smaller than the 128×128 example dither matrix referred to above. Let us assume that the binary matrix, which specifies which pixels will receive ink dots when the subregion 98 is to present one of the light-gray levels to which the FIG. 7 routine is directed, specifies that only pixels 100, 102, 104, 106, 108, and 110 are to receive ink dots. To each of the pixels thus selected, Voronoi partitioning associates a partition consisting of all points that are at least as close to that pixel's center as to the center of any other pixels still selected to receive ink dots. Procedures for determining the (polygonal) partitions' vertices and ordering those vertices for area-determination calculations are well known in the art and can be found, for instance, in K. Mulmuley, *Computational Geometry, An Introduction Through Randomized* Algorithms, Prentice-Hall, Englewood Cliffs, N.J., 1994.

In performing the partitioning, it must be remembered that the dither matrix is to "tile" the image; in a uniform gray image adjacent subregions' pixels 112 and 114 receive ink dots whenever corresponding pixels 100 and 102 do, so the resultant partitioning is as FIG. 8's dashed lines indicate. In particular, pixel 100's partition includes area 116, too, because the points that area 116 contains are closer to the corresponding pixel 112 than to pixels 108 and 110. One way of looking at this is to consider the subregion a flexible sheet, form a tube from the sheet by attaching its top edge to its bottom edge, connect the two ends tube form a torus, and use the geodesic distances between points on the resultant torus to determine the Voronoi partitions.

The partitions are used to determine which ink-dot-receiving pixel is in the area most crowded by ink dots. The pixel associated with the lowest-area Voronoi partition is considered to be associated with the tightest cluster.

If only one such pixel's cluster is tightest, the corresponding dither-matrix location is the one to which the current rank is assigned. If more than one pixel's partition has the lowest area, one might simply select among the lowest-partition-area pixels at random to select the next pixel whose ink dot will be removed. But we have found that applying a further criterion for pixel selection tends to suppress visually disturbing artifacts that would otherwise remain.

Whereas the cluster-tightness measure applied in FIG. 7's step 118 indicates how crowded by other ink-dot-containing pixels the candidate pixel corresponding to the candidate dither-matrix location is, the cluster-tightness measure applied in block 120 indicates how crowded the candidate location is by locations whose ranks (as so far determined) are close to the rank being assigned. What constitutes "close" is a matter of design choice. For example, some designs may consider a rank close if its associated threshold is the same or differs by only one from the threshold value being assigned. Others may consider a rank close if it differs from the rank being assigned by less than the number of subregion pixels per threshold value (=64 or 65 in the example). We call this the "distance criterion."

The present invention's teachings can be implemented by employing a Voronoi-partitioning cluster-tightness measure to apply this criterion, but we prefer a different measure. In the step that block 120 represents, the measure of the tightness with which such closely ranked pixels are clustered about a given pixel is simply the lowest distance from the given pixel to a closely ranked pixel: of candidate locations that tied in step 118, the one considered to be in the tightest cluster of such closely ranked locations is the candidate whose distance to the closest closely ranked location is lowest. That is, if $P=\{p_i;\ i=0, \ldots, M-1\}$ is the set of M such closely ranked locations and $X=\{x_j;\ j=0, \ldots, N-1\}$ is the set of N candidate locations that survive step 118, then the index J of the location to be ranked next is given by:

$$J = \arg\min_j \left\{ \min_i D(x_j,\ p_i) \right\},$$

where D(x,y) is the minimum geodesic distance on the torus described above between the subregion pixels that correspond to locations x and y.

Figure 9A:
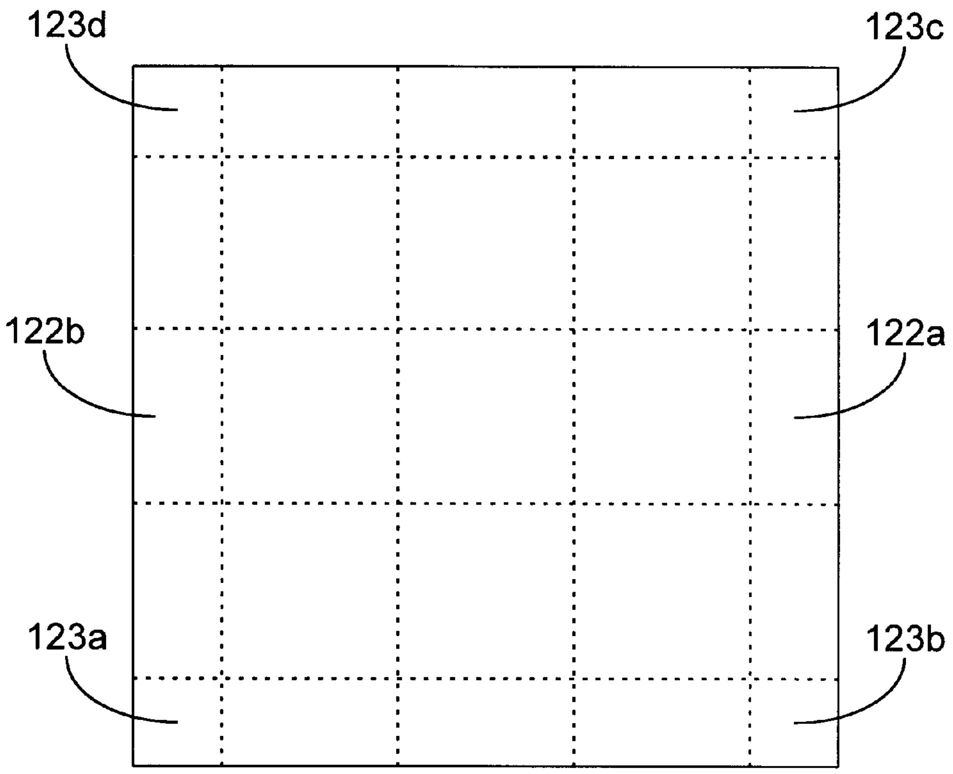
FIG. 9A–C are diagrams used to illustrate block partitioning.
Figure 9B:
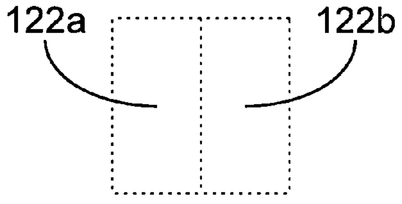
Figure 9C:
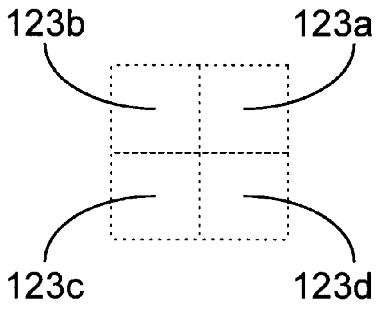

If this criterion, too, results in a tie, we apply yet another criterion to the tied locations, as block 121 indicates. For this criterion, the entire subregion matrix is divided into blocks. For example, if the binary-value-matrix size is 128×128, we may divide the subregion of FIG. 9A into sixteen blocks of size 32×32, as that drawing's dashed lines indicate. For reasons similar to those discussed above by reference to FIG. 8, a block's locations correspond to pixels that are close when the planar subregion is deformed into a torus, so a location corresponding to a pixel near one edge of the subregion belongs to the same block as a location corresponding to a pixel near the opposite edge. For instance, FIG. 9A's sub-blocks 122*a–b* form the single block of FIG. 9B, and FIG. 9A's sub-blocks 123*a–d* form the single block of FIG. 9C.

If a block in which the pixel corresponding to a given one of the surviving candidates is located contains more remaining dots than the blocks that contain pixels corresponding to any of the other surviving candidates—i.e., if the corresponding submatrix of the binary-value matrix contains more remaining "1's" than the does any other submatrix corresponding to a block that contains a surviving candidate—then the given surviving candidate is the one selected to be ranked next. Otherwise, the choice among the surviving candidates is made on a random basis.

The next location having thus been selected, the current rank (or, equivalently, the associated threshold value) is entered into the corresponding location in the dither array, as block 124 indicates, and the rank to be assigned in the next loop is decremented, as block 126 indicates. The loop of FIG. 7 is then repeated until the rank value of 0 has been assigned.

Figure 10A:
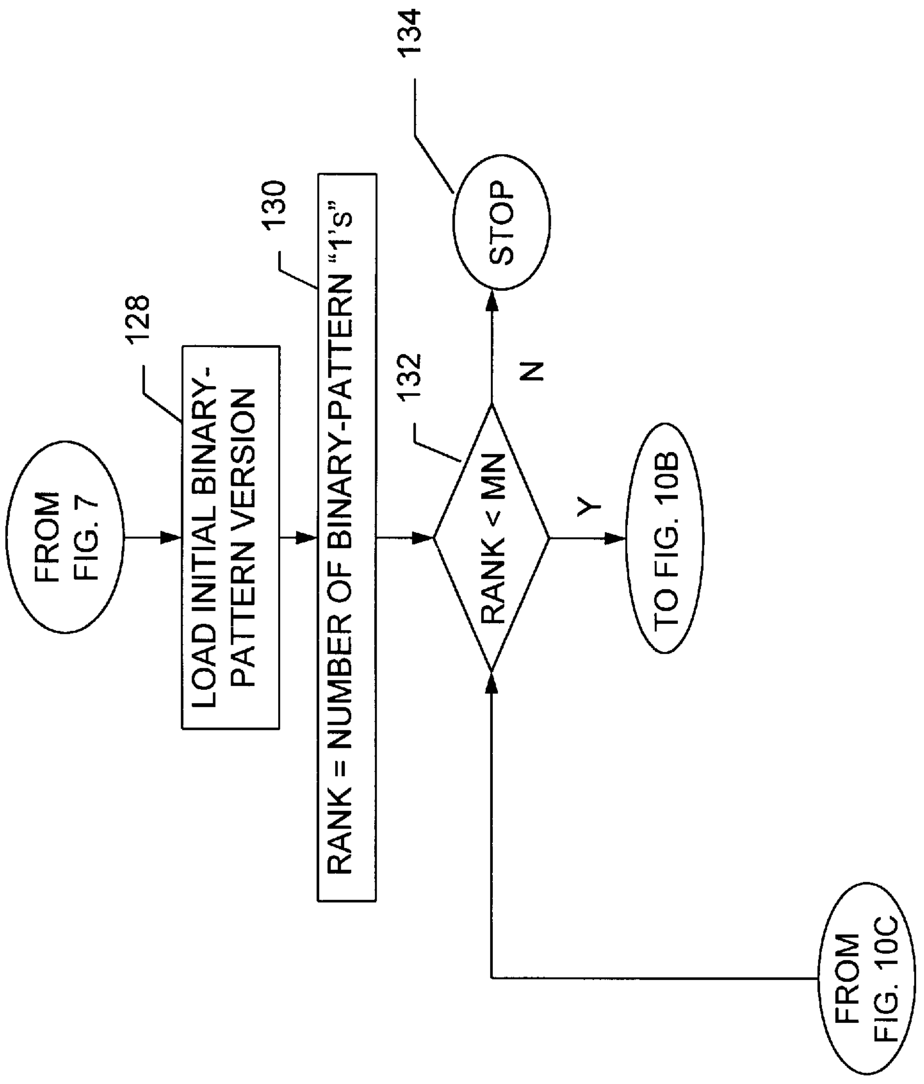
FIGS. 10A–C together form a flow chart of the present invention's method of assigning the higher rank values to the dither-matrix locations.
Figure 10B:
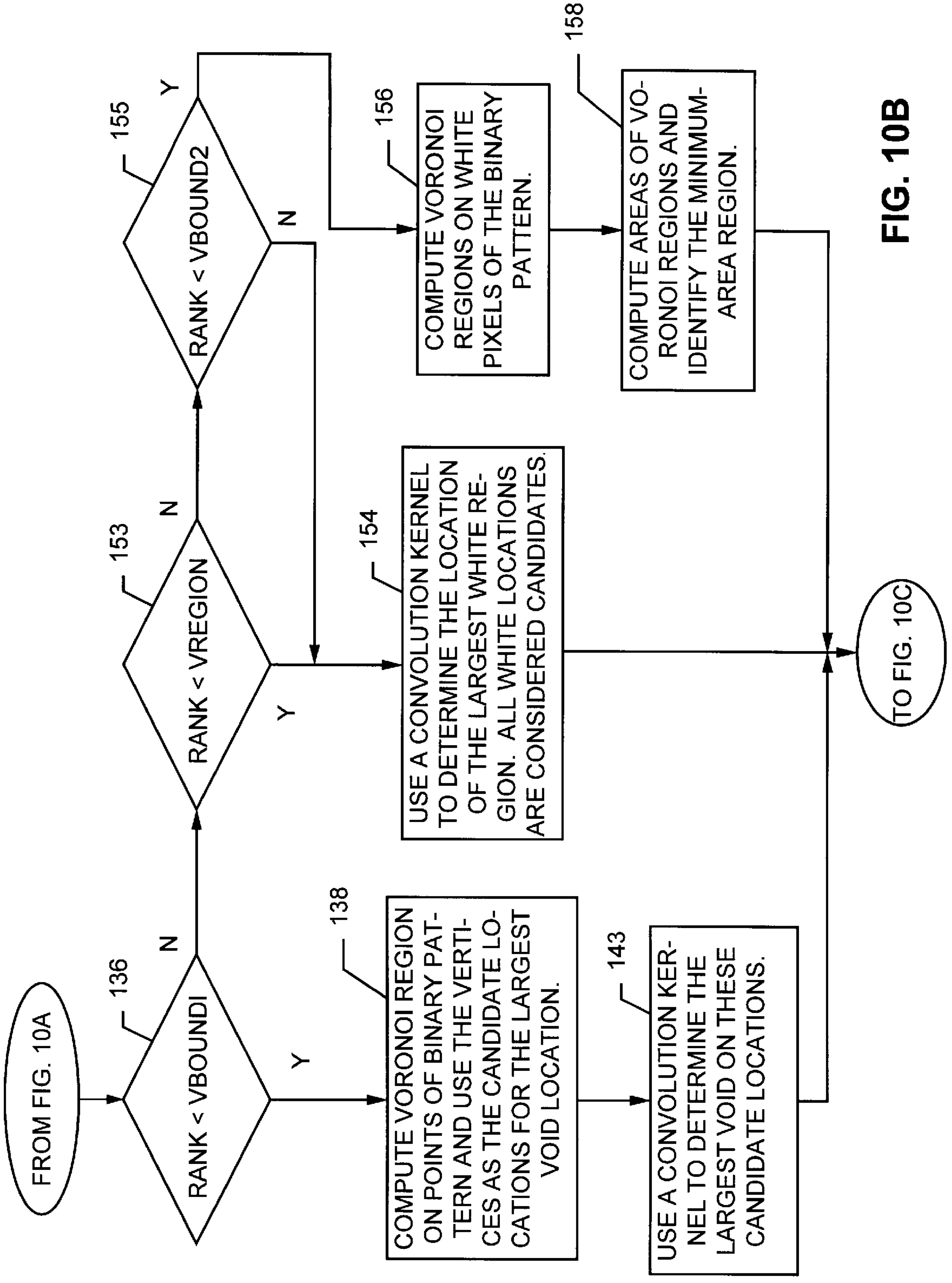
Figure 10C:
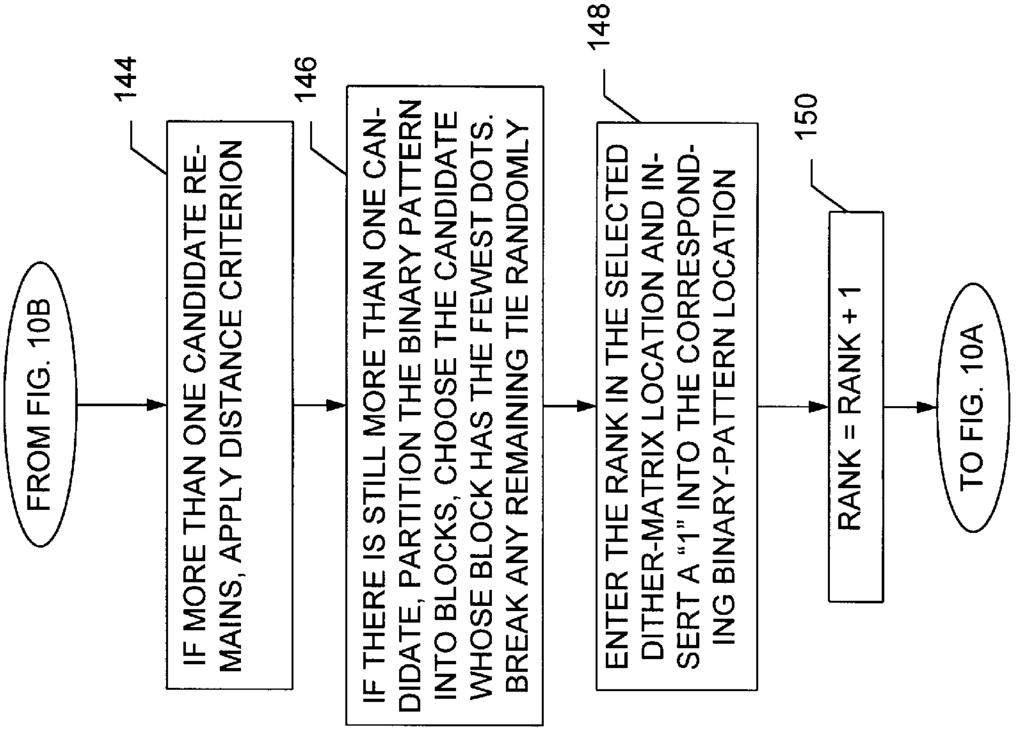

In contrast to the FIG. 7 routine, which assigns ranks in descending order to locations that will receive thresholds lower than the initially chosen gray-scale value, the routine of FIGS. 10A, 10B, and 10C (collectively, "FIG. 10") assigns ranks in ascending order to locations that will receive thresholds higher than that. As block 128 indicates, the FIG. 10 routine begins with the same initial binary-value matrix that the FIG. 7 routine did, but the FIG. 10 routine assigns ranks to locations corresponding to the "0's" in the initial binary-value matrix, not to the locations that correspond to its "1's."

As block 130 indicates, this routine begins with a rank equal to the number of "1's" in the initial binary-value matrix; i.e., it begins with the lowest rank still unassigned. As blocks 132 and 134 indicate, the routine stops when the incremented rank value is no longer less than the total number of dither-matrix locations, which is MN in an M×N matrix.

Until then, the next rank's location is selected in a manner that depends on that rank's value. FIG. 10B shows that the rank range is divided into four intervals. The lowest interval's upper bound $V_{BOUND1}$ in the example is 1600, or about 10% of the total rank range. Now, when ranks in this range are being assigned, the overwhelming majority of the binary-value matrix's locations contain "0's": nearly all locations are yet to be assigned thresholds. In the subregion 98 that FIG. 8 depicts, for instance, all of the pixels except pixels 100, 102, 104, 106, 108, and 110 are candidates. So, as FIG. 10B's blocks 136 and 138 indicate, the routine reduces the number of candidate locations by performing Voronoi partitioning. Specifically, a location is considered a candidate only if it corresponds to a subregion pixel, such as pixel 140, that contains a resultant partition vertex such as vertex 142.

The method determines which of these locations corresponds to a (Voronoi-vertex-containing) subregion pixel in the largest void, or white space, by assigning each candidate location a score that results from centering a convolution kernel on the candidate and taking the sum of the kernel coefficients that thereby correspond to pixels that do not yet contain dots. Block 143 represents this step, which can also be thought of as identifying the pixel about which dot-receiving pixels are clustered least tightly. One type of kernel that can be used for this purpose is a 9×9 1.5-pixel-width-standard-deviation Gaussian kernel, of which FIG. 11 depicts an example.

If a tie score results, we apply the distance criterion, as block 144 indicates. The operation is the same as that of FIG. 7's step 120, with two exceptions. First, the ranks of already-assigned locations in the set used in applying the criterion are lower than the rank being assigned, not higher. Second, since dots are conceptually being added to the largest voids rather than removed from the tightest clusters, the pixel selected is the one about which such closely ranked pixels are clustered most loosely, not most tightly, so the search is for the maximum distance, not the minimum. That is, if $P=\{p_i;\ i=0, \ldots, M-1\}$ is the set of M such closely ranked locations and $X=\{x_j; j=0, \ldots, N-1\}$ is the set of N candidate locations that survive the previous step, then the index J of the location to be ranked next is given by:

$$J = \arg\max_j\left\{\min_i D(x_j,\ p_i)\right\},$$

where D(x,y) is the minimum geodesic distance on the torus described above between the subregion pixels that correspond to locations x and y.

If a tie still results, we break it, as block 146 indicates, by employing a criterion complementary to the block-partitioning criterion used in FIG. 7's block 121. If a block in which the pixel corresponding to a given one of the surviving candidates is located contains fewer dots than the blocks that contain pixels corresponding to any of the other surviving candidates—i.e., if the corresponding submatrix of the binary-value matrix contains fewer "1's" than the does any other submatrix corresponding to a block that contains a surviving candidate—then the given surviving candidate is the one selected to be ranked next. Any further tie is broken by random selection.

The order in which initially tied candidates are ranked, which we determine by applying the criteria of steps 144 and 146—or those of FIG. 7's steps 120 and 121—is important in several situations. First, if the number of tied candidates exceeds the number of locations to which the current threshold still needs to be assigned-e.g., if the number of such candidates is greater than 64 or 65 for an 128×128 array of 255 different threshold values—then the rank order affects the thresholds that different ones of those tied locations will receive, so disturbing light- and mid-tone artifacts will tend to occur if the selection is made imprudently. Second, if the selected candidate is located within the area to which a selection criterion's convolution kernel is applied to compute another candidate's score, that score will change and can prevent what might otherwise have been that other location's selection to receive the same threshold. Third, another candidate's score can similarly be changed, with similar results, if its Voronoi partition shares one or more vertices with the selected candidate's and thus has the size of its Voronoi partition changed by that selection. In practicing the present invention, one could test for these conditions and use the additional selection criteria only if they apply, but we prefer to use the additional criteria uniformly so that the resultant dither matrix's quality is relatively independent of the number of quantization levels and thus of the number of locations that are to be assigned any given threshold.

We enter the rank (or threshold) in the selected dither-matrix location and, since the FIG. 10 routine assigns ranks in ascending order, i.e., in the direction of increased image darkness, we then add a "1" to the corresponding binary-value-matrix location, as block 148 indicates. Block 150 represents incrementing the rank before repeating the FIG. 10 loop.

At some point, the number of "1's" in the binary-value matrix-i.e., the number of ink dots that will cause it to achieve the gray value that corresponds to the rank currently being assigned—is large enough that computing Voronoi partitions based on the already-assigned locations becomes less attractive. This is the level we refer to above as $V_{BOUND1}$. If the rank to be assigned exceeds that level but is lower than a level $V_{REGION}$, at which the number of "0's" has been reduced to the number of "1's" to which level $V_{BOUND1}$ corresponds, then the number of candidate white spaces is not reduced by Voronoi partitioning, as it was in step 138. Instead, all white spaces are assigned scores by applying a kernel in the manner described above in connection with step 143. Blocks 153 and 154 represent this aspect of the FIG. 10 routine. If necessary, the number of candidate locations is further reduced, as before, in FIG. 10C's steps 144, 146, and 148.

Once the rank to be assigned has reached level $V_{REGION}$, which equals 90% of the total rank range, the number of "0's" has been reduced to the number of "1's" to which level $V_{BOUND1}$ corresponds, so it again becomes attractive to use Voronoi partitioning—if the partitions are based on the locations of the binary matrix's "0's" rather than on the location of its "1's." As blocks 155, 156, and 158 indicate, this is accordingly what the FIG. 10 routine does so long as the rank to be assigned is less than a higher level, $V_{BOUND2}$, at which the number of remaining "0's," i.e., the number of locations left to be assigned ranks, equals the number of dither-matrix locations per threshold (64 or 65 in the example). This number is low enough that no special effort needs to be taken to reduce the number of candidate locations. When the rank to be assigned does exceed $V_{BOUND2}$, then the routine uses the block-154 operation to assign scores. In either case, the operations of FIG. 10C are again employed if necessary to eliminate ties.

The process of FIGS. 7 and 10 can be used to assign thresholds explicitly as locations are chosen or instead merely to assign ranks and thereby produce as its output a dither matrix of ranks, which implicitly indicate what the thresholds. In the latter case, thresholds are thereafter assigned explicitly in accordance with the relationship outlined above. The resultant matrix is then included in instructions for performing a processing sequence like that of FIG. 4, and the resultant driver software is written to a storage medium such as a CD-ROM for use by a computer to drive a printer or other image-presentation device.

By applying the additional criteria described above, we have been able to eliminate to a significant degree much of the visually disturbing artifacts that afflict conventional dithering. The present invention accordingly constitutes a significant advance in the art.

What is claimed is:

1. A method of generating a dither matrix of dither-matrix locations that contain dither-matrix thresholds comprising the steps of:

associating the dither matrix locations with respective subregion pixels of an image subregion, and assigning thresholds to at least some of the dither matrix locations by:

determining for each of a plurality of the subregion pixels the relative tightness thereto with which are clustered thereabout pixels that receive imaging-agent dots when the subregion presents a uniform gray-scale level that corresponds to a threshold being assigned to a respective dither matrix location;

identifying each subregion pixel for which the tightness thereby determined is greatest;

determining for each of a plurality of the subregion pixels thus identified the relative tightness thereto with which are clustered thereabout subregion pixels that have been assigned thresholds whose ranks are in a rank range that depends on the threshold being assigned and excludes some subregion pixels that receive imaging-agent dots when the subregion presents the uniform gray-scale level that corresponds to the threshold being assigned;

selecting at least one subregion pixel for which the tightness thereby determined is greatest; and assigning the threshold to a dither-matrix location associated with a subregion pixel thus selected.

2. A method as defined in claim 1 wherein the step of assigning the threshold comprises:

dividing the subregion into blocks;

choosing each selected pixel contained in a block that receives the most imaging-agent dots when the subregion presents a uniform gray-scale level that corresponds to the threshold being assigned; and assigning the threshold to a dither-matrix location associated with a subregion pixel thus chosen.

3. A method as defined in claim 2 wherein the step of determining for each of a plurality of the identified subregion pixels the relative tightness thereto with which are clustered thereabout subregion pixels that have been assigned thresholds whose ranks are in the rank range comprises determining the distance from the subregion pixel for which the tightness is being determined to the closest subregion pixel thereto that has been assigned a threshold whose rank is in the rank range.

4. A method as defined in claim 1 wherein the step of determining for each of a plurality of the identified subregion pixels the relative tightness thereto with which are clustered thereabout subregion pixels that have been assigned thresholds whose ranks are in the rank range comprises determining the distance from the subregion pixel for which the tightness is being determined to the closest subregion pixel thereto that has been assigned a threshold whose rank is in the rank range.

5. A method as defined in claim 1 wherein the size of the rank range equals the number of dither-matrix locations per threshold.

6. A method as defined in claim 1 further comprising the step of assigning thresholds to at least some other of the dither matrix locations by:

determining for each of a plurality of the subregion pixels the relative tightness thereto with which are clustered thereabout pixels that receive imaging-agent dots when the subregion presents a uniform gray-scale level that corresponds to a threshold being assigned to a respective dither matrix location;

identifying each subregion pixel for which the tightness thereby determined is least;

determining for each of a plurality of the subregion pixels thus identified the relative tightness thereto with which are clustered thereabout subregion pixels that have been assigned thresholds whose ranks are in a rank range that depends on the threshold being assigned and excludes some subregion pixels that receive imaging-agent dots when the subregion presents the uniform gray-scale level that corresponds to the threshold being assigned;

selecting at least one subregion pixel for which the tightness thereby determined is least; and assigning the threshold to a dither-matrix location associated with a subregion pixel thus selected.

7. An apparatus for presenting an image in response to electrical source-image signals representing a source image, comprising:

a dither matrix having dither-matrix locations that contain dither-matrix thresholds generated by:

associating the dither matrix locations with respective subregion pixels of an image subregion, and assigning thresholds to at least some determining matrix locations by:

determining for each of a plurality of the subregion pixels the relative tightness thereto with which are clustered thereabout pixels that receive imaging-agent dots when the subregion presents a uniform gray-scale level that corresponds to a threshold being assigned to a respective dither matrix location;

identifying each subregion pixel for which the tightness thereby determined is greatest;

determining for each of a plurality of the subregion pixels thus identified the relative tightness thereto with which are clustered thereabout subregion pixels that have been assigned thresholds whose ranks are in a rank range that depends on the threshold being assigned and excludes some subregion pixels that receive imaging-agent dots when the subregion presents the uniform gray-scale level that corresponds to the threshold being assigned;

selecting at least one subregion pixel for which the tightness thereby determined is greatest; and assigning the threshold to a dither-matrix location associated with a subregion pixel thus selected; and an image-presenting mechanism responsive to said source-image signals and said dither matrix thresholds to present an image on an image medium.

8. An apparatus as defined in claim 7 wherein the image-presenting mechanism comprises a printer.

9. A method of generating a dither matrix of dither-matrix locations that contain dither-matrix thresholds comprising the steps of:

associating the dither matrix locations with respective subregion pixels of an image subregion, and assigning thresholds to at least some of the dither matrix locations by:

determining for each of a plurality of the subregion pixels the relative tightness thereto with which are clustered thereabout pixels that receive imaging-agent dots when the subregion presents a uniform gray-scale level that corresponds to a threshold being assigned to a respective dither matrix location;

identifying each subregion pixel for which the tightness thereby determined is least;

determining for each of a plurality of the subregion pixels thus identified the relative tightness thereto with which are clustered thereabout subregion pixels that have been assigned thresholds whose ranks are in a rank range that depends on the threshold being assigned and excludes some subregion pixels that receive imaging-agent dots when the subregion presents the uniform gray-scale level that corresponds to the threshold being assigned;

selecting at least one subregion pixel for which the tightness thereby determined is least; and assigning the threshold to a dither-matrix location associated with a subregion pixel thus selected.

10. A method as defined in claim 9 wherein the step of assigning the threshold comprises:

dividing the subregion into blocks;

choosing each selected pixel contained in a block that receives the fewest imaging-agent dots when the subregion presents a uniform gray-scale level that corresponds to the threshold being assigned; and assigning the threshold to a dither-matrix location associated with a subregion pixel thus chosen.

11. A method as defined in claim 10 wherein the step of determining for each of a plurality of the identified subregion pixels the relative tightness thereto with which are clustered thereabout subregion pixels that have been assigned thresholds whose ranks are in the rank range comprises determining the distance from the subregion pixel for which the tightness is being determined to the furthest subregion pixel thereto that has been assigned a threshold whose rank is in the rank range.

12. A method as defined in claim 9 wherein the step of determining for each of a plurality of the identified subregion pixels the relative tightness thereto with which are clustered thereabout subregion pixels that have been assigned thresholds whose ranks are in the rank range comprises determining the distance from the subregion pixel for which the tightness is being determined to the furthest subregion pixel thereto that has been assigned a threshold whose rank is in the rank range.

13. A method as defined in claim 9 wherein the size of the rank range equals the number of dither-matrix locations per threshold.

14. An apparatus for presenting an image in response to electrical source-image signals representing a source image, comprising:

a dither matrix having dither-matrix locations that contain dither-matrix thresholds generated by:

associating the dither matrix locations with respective subregion pixels of an image subregion, and assigning thresholds to at least some of the dither matrix locations by:

determining for each of a plurality of the subregion pixels the relative tightness thereto with which are clustered thereabout pixels that receive imaging-agent dots when the subregion presents a uniform gray-scale level that corresponds to a threshold being assigned to a respective dither matrix location;

identifying each subregion pixel for which the tightness thereby determined is least;

determining for each of a plurality of the subregion pixels thus identified the relative tightness thereto with which are clustered thereabout subregion pixels that have been assigned thresholds whose ranks are in a rank range that depends on the threshold being assigned and excludes some subregion pixels that receive imaging-agent dots when the subregion presents the uniform gray-scale level that corresponds to the threshold being assigned;

selecting at least one subregion pixel for which the tightness thereby determined is least; and assigning the threshold to a dither-matrix location associated with a subregion pixel thus selected; and an image-presenting mechanism responsive to said source-image signals and to said dither matrix thresholds for presenting an image on an image medium.

15. An apparatus as defined in claim 14 wherein the image presenting mechanism comprises a printer.

16. A medium readable by a machine embodying a program of instructions executable by said machine to perform a method of generating a dither matrix of dither-matrix locations that contain dither-matrix thresholds, said dither matrix generating method comprising the steps of:

associating the dither matrix locations with respective subregion pixels of an image subregion, and assigning thresholds to at least some of the dither matrix locations by:

determining for each of a plurality of the subregion pixels the relative tightness thereto with which are clustered thereabout pixels that receive imaging-agent dots when the subregion presents a uniform gray-scale level that corresponds to a threshold being assigned to a respective dither matrix location;

identifying each subregion pixel for which the tightness thereby determined is greatest;

determining for each of a plurality of the subregion pixels thus identified the relative tightness thereto with which are clustered thereabout subregion pixels that have been assigned thresholds whose ranks are in a rank range that depends on the threshold being assigned and excludes some subregion pixels that receive imaging-agent dots when the subregion presents the uniform gray-scale level that corresponds to the threshold being assigned;

selecting at least one subregion pixel for which the tightness thereby determined is greatest; and assigning the threshold to a dither-matrix location associated with a subregion pixel thus selected.

17. A medium as defined in claim 16 wherein in the dither matrix generating method, the step of assigning the threshold comprises:

dividing the subregion into blocks;

choosing each selected pixel contained in a block that receives the most imaging-agent dots when the subregion presents a uniform gray-scale level that corresponds to the threshold being assigned; and assigning the threshold to a dither-matrix location associated with a subregion pixel thus chosen.

18. A medium as defined in claim 17 wherein in the dither matrix generating method, the step of determining for each of a plurality of the identified subregion pixels the relative tightness thereto with which are clustered thereabout subregion pixels that have been assigned thresholds whose ranks are in the rank range comprises determining the distance from the subregion pixel for which the tightness is being determined to the closest subregion pixel thereto that has been assigned a threshold whose rank is in the rank range.

19. A medium as defined in claim 16 wherein in the dither matrix generating method, the step of determining for each of a plurality of the identified subregion pixels the relative tightness thereto with which are clustered thereabout subregion pixels that have been assigned thresholds whose ranks are in the rank range comprises determining the distance from the subregion pixel for which the tightness is being determined to the closest subregion pixel thereto that has been assigned a threshold whose rank is in the rank range.

20. A medium as defined in claim 16 wherein in the dither matrix generating method, the size of the rank range equals the number of dither-matrix locations per threshold.

21. A medium as defined in claim 16 wherein the dither matrix generating method further comprises the step of assigning thresholds to at least some other of the dither matrix locations by:

determining for each of a plurality of the subregion pixels the relative tightness thereto with which are clustered thereabout pixels that receive imaging-agent dots when the subregion presents a uniform gray-scale level that corresponds to a threshold being assigned to a respective dither matrix location;

identifying each subregion pixel for which the tightness thereby determined is least;

determining for each of a plurality of the subregion pixels thus identified the relative tightness thereto with which are clustered thereabout subregion pixels that have been assigned thresholds whose ranks are in a rank range that depends on the threshold being assigned and excludes some subregion pixels that receive imaging-agent dots when the subregion presents the uniform gray-scale level that corresponds to the threshold being assigned;

selecting at least one subregion pixel for which the tightness thereby determined is least; and assigning the threshold to a dither-matrix location associated with a subregion pixel thus selected.

* * * * *

UNITED STATES PATENT AND TRADEMARK OFFICE

CERTIFICATE OF CORRECTION

PATENT NO. : 6,088,512
DATED : July 11, 2000
INVENTOR(S) : Hakan Ancin, et al.

It is certified that error appears in the above-identified patent and that said Letters Patent is hereby corrected as shown below:

Column 14,
Line 29, change "determining" to "of the dither".

Signed and Sealed this

Ninth Day of October, 2001

*Attest:*

Nicholas P. Godici

NICHOLAS P. GODICI

*Attesting Officer*

*Acting Director of the United States Patent and Trademark Office*